(12) United States Patent
Chu

(10) Patent No.: US 6,543,940 B2
(45) Date of Patent: Apr. 8, 2003

(54) FIBER CONVERTER FACEPLATE OUTLET

(76) Inventor: Max Chu, 4F., No. 126, Hsing Yun Street, Na Fu District, Taipei (TW)

( * ) Notice: Subject to any disclaimer, the term of this patent is extended or adjusted under 35 U.S.C. 154(b) by 175 days.

(21) Appl. No.: 09/826,213

(22) Filed: Apr. 5, 2001

(65) Prior Publication Data

US 2002/0146207 A1 Oct. 10, 2002

(51) Int. Cl.⁷ .................................................. G02B 6/36
(52) U.S. Cl. ........................................ 385/53; 439/535
(58) Field of Search .......................... 385/53, 136–138; 439/76.1, 535, 536, 404

(56) References Cited

U.S. PATENT DOCUMENTS 4,874,904 A  * 10/1989 DeSanti et al.
5,362,254 A  * 11/1994 Siemon et al. ............... 439/536
5,599,206 A  *  2/1997 Slack et al. .................. 439/607
6,350,151 B1 *  2/2002 Elliot et al. .................. 439/535
6,435,727 B1 *  8/2002 Fingler et al. ................. 385/53

* cited by examiner

*Primary Examiner*—Khiem Nguyen
(74) *Attorney, Agent, or Firm*—Varndell & Varndell, PLC

(57) ABSTRACT

A fiber converter faceplate outlet includes a rack holding a circuit board unit, and a metal shield covering the rack and the circuit board unit to protect against electromagnetic interference, the circuit board unit including a fiber optical transceiver having two jacks adapted to receive the fiber connector of a respective optic cable, and a telecommunication connector having a RJ45 jack adapted to receive the RJ45 plug of a unshielded twisted pair cable being connected to a network interface card of a personal computer.

4 Claims, 11 Drawing Sheets

_US 6,543,940 B2_

FIBER CONVERTER FACEPLATE OUTLET

BACKGROUND AND SUMMARY OF THE INVENTION

The present invention relates to a fiber converter faceplate outlet and, more particularly, to such a fiber converter faceplate outlet adapted for use to connect the network interface card of a personal computer to a sever through a switch-hub and a router.

The network interface card of a personal computer is connected to a RJ45 plug at one end of a unshielded twisted pair cable, which has a second RJ45 plug at the other end connected to a RJ45 jack in the wall. The RJ45 jack in the wall is connected to a switch-hub through a unshielded twisted pair cable to a router, which router is connected to a sever through another unshielded twisted pair cable. This personal-computer-to-sever connection cannot effectively eliminate noises, and its data transmission speed is low. In order to eliminate these problems, fiber optic cables are used for the connection between a personal computer and a sever. Therefore, "Fiber to the desk" and "Fiber to the home" are well developed. Fiber cable transmission between a personal computer and a sever can be achieved by either of the following two ways shown in FIGS. 1 and 2. In the method shown in FIG. 1, the sever 911 is linked to a router 900 through a fiber optic cable 912, the router 900 is then linked to a switch-hub 914 by a fiber optic cable 913, the switch-hub 914 is in turn connected to a fiber converter 916 by a fiber optic cable 915, which fiber converter 916 is connected to a fiber connector outlet 917 in the wall 92 by a fiber optic cable 902 and then to a fiber converter 919 through a fiber jumper patch cord 918, and the fiber converter 919 is connected to the network interface card 931 of the personal computer 93 by a unshielded twisted pair cable 910. In the method shown in FIG. 2, the sever 941 is connected in series through a router 901 and then a switch-hub 944 to a fiber converter 846 by unshielded twisted pair cables 942, 943 and 945, and the fiber converter 946 is in turn connected to a fiber connector outlet 947 in the wall 96 through a fiber optic cable 904 and then to a fiber converter 949 through a fiber jumper patch cord 948, and the fiber converter 949 is connected to the network interface card 951 of the personal computer 95 by a unshielded twisted pair cable 940. The advantages of the aforesaid two methods include interference and noise free, high capacity, and long connection distance. However, these methods still have drawbacks as outlined hereinafter.

1. Because a big number of many parts (including fiber converters 916, 919; 946,949, fiber jumper patch cord 918;948, and fiber connector outlet 917;947) are used, the installation cost is high.
2. Because a big number of parts are used, the installation and operation procedures are complicated, and the line fails in case the connection between one part (fiber converter 916, 919; 946,949, fiber jumper patch cord 918;948, or fiber connector outlet 917;947) and the respective cable (fiber optic cable or UTP cable 912, 915, 902; 942, 945, 904) is disconnected accidentally.

The present invention has been accomplished to provide a fiber converter faceplate outlet, which eliminates the aforesaid drawbacks. It is one object of the present invention to provide a fiber converter faceplate outlet, which is easy to assemble and convenient to install. It is another object of the present invention to provide a fiber converter faceplate outlet, which requires less installation space. It is still another object of the present invention to provide a fiber converter faceplate outlet, which is inexpensive to manufacture and can be used to substitute for conventional fiber connector outlet, fiber converter, and jumper cable. It is still another object of the present invention to provide a fiber converter faceplate outlet, which has a direct current power jack and a termination block for connecting external power source to an indoor power cord. According to one aspect of the present invention, the fiber converter faceplate outlet comprises a rack holding a circuit board unit, and a metal shield covering the rack and the circuit board unit to protect against electromagnetic interference. The circuit board unit comprises a fiber optical transceiver having two jacks adapted to receive the fiber connector of a respective optic cable, and a telecommunication connector having a RJ45 jack adapted to receive the RJ45 plug of a unshielded twisted pair cable being connected to a network interface card of a personal computer. According to another aspect of the present invention, the rack further comprises a plurality of keyway-like mounting holes for fastening to respective posts of a wall junction box by screws. According to still another aspect of the present invention, the direct current power jack has a receiving side adapted to receive external power cable from external power supply, and the terminal block has a receiving side adapted to receive a house internal power cable.

DETAILED DESCRIPTION OF THE PREFERRED EMBODIMENT

Figure 1:
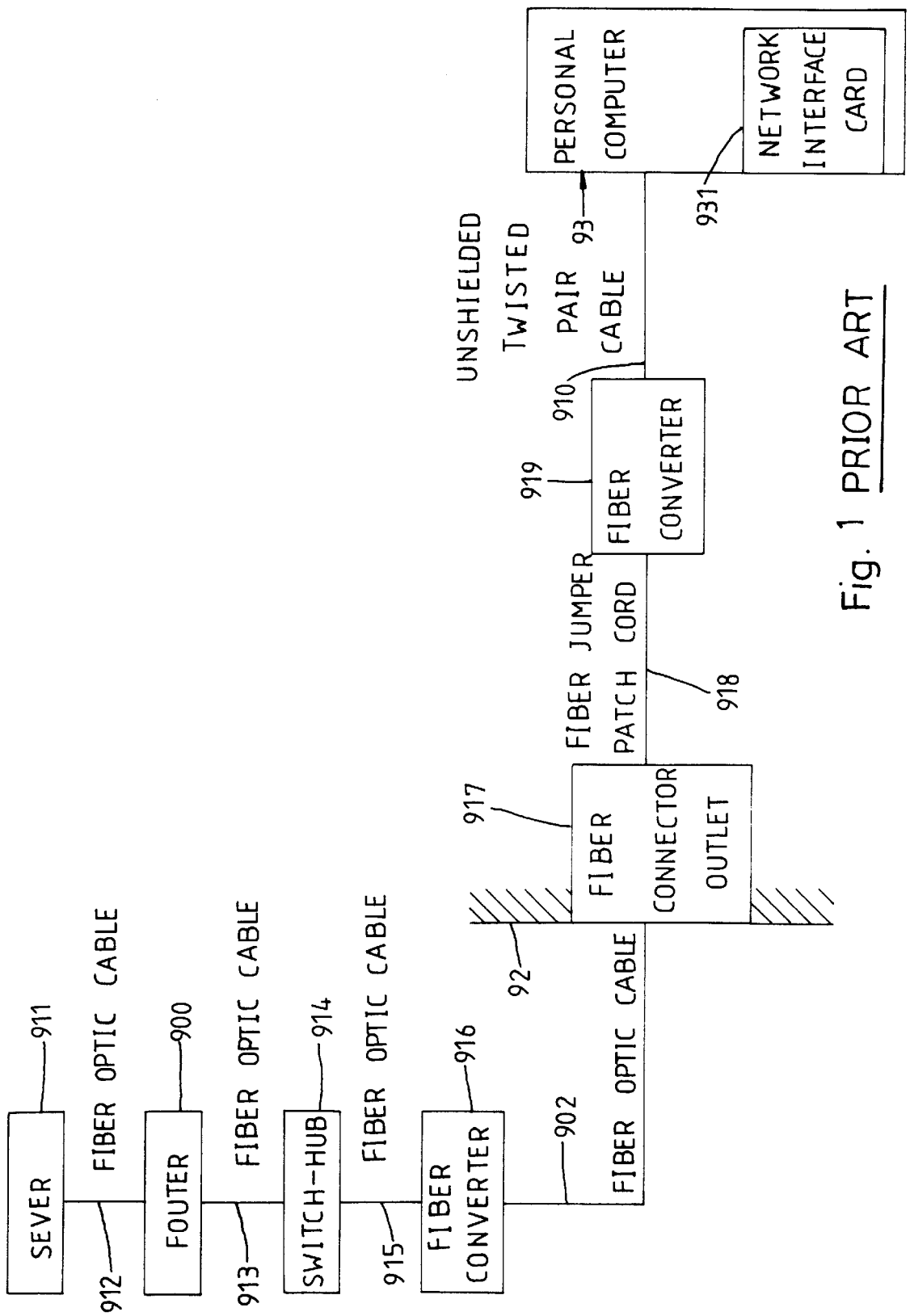
FIG. 1 is a block diagram showing an application example of a fiber converter according to the prior art.
Figure 2:
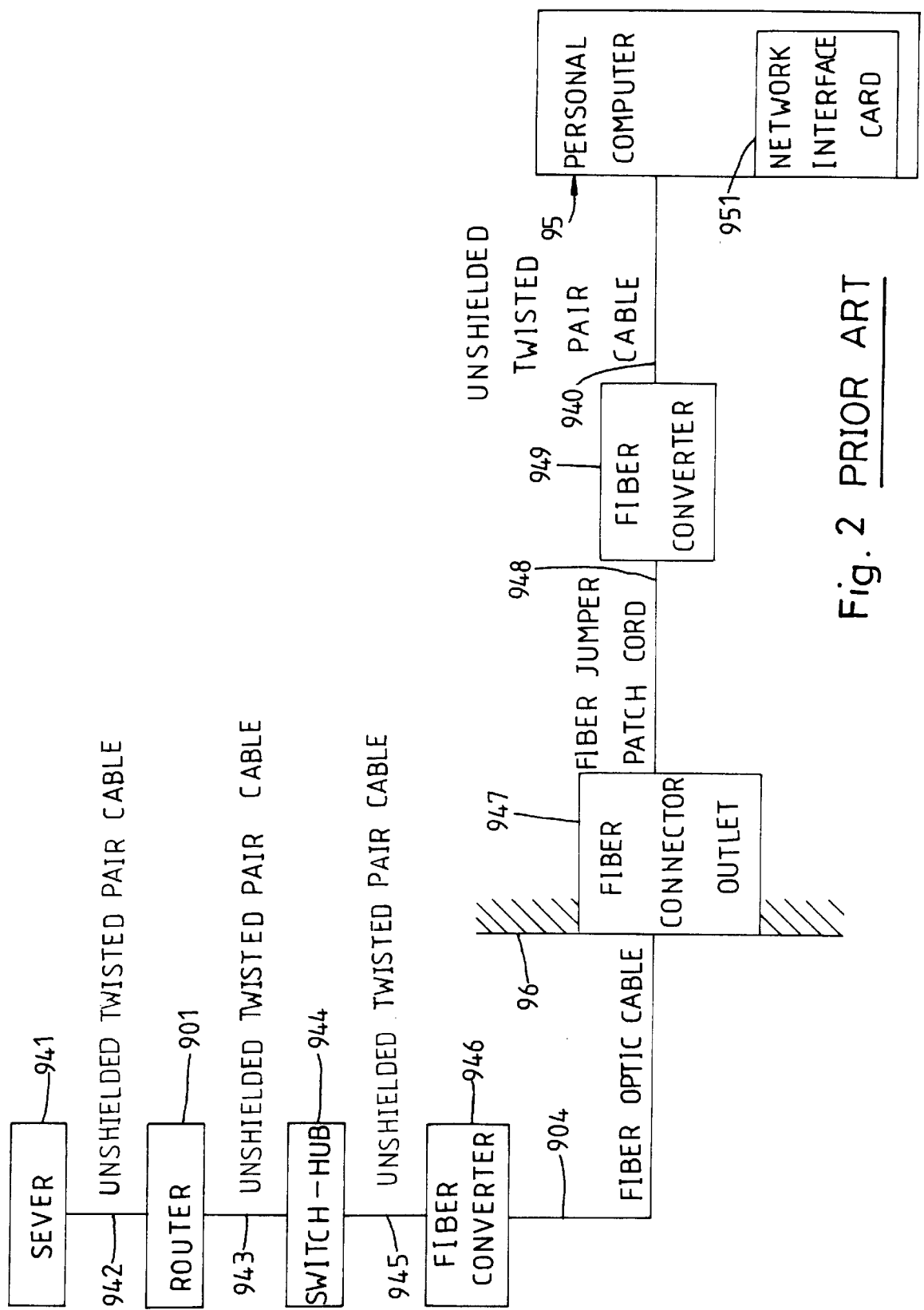
FIG. 2 is a block diagram showing another application example of a fiber converter according to the prior art.
Figure 3:
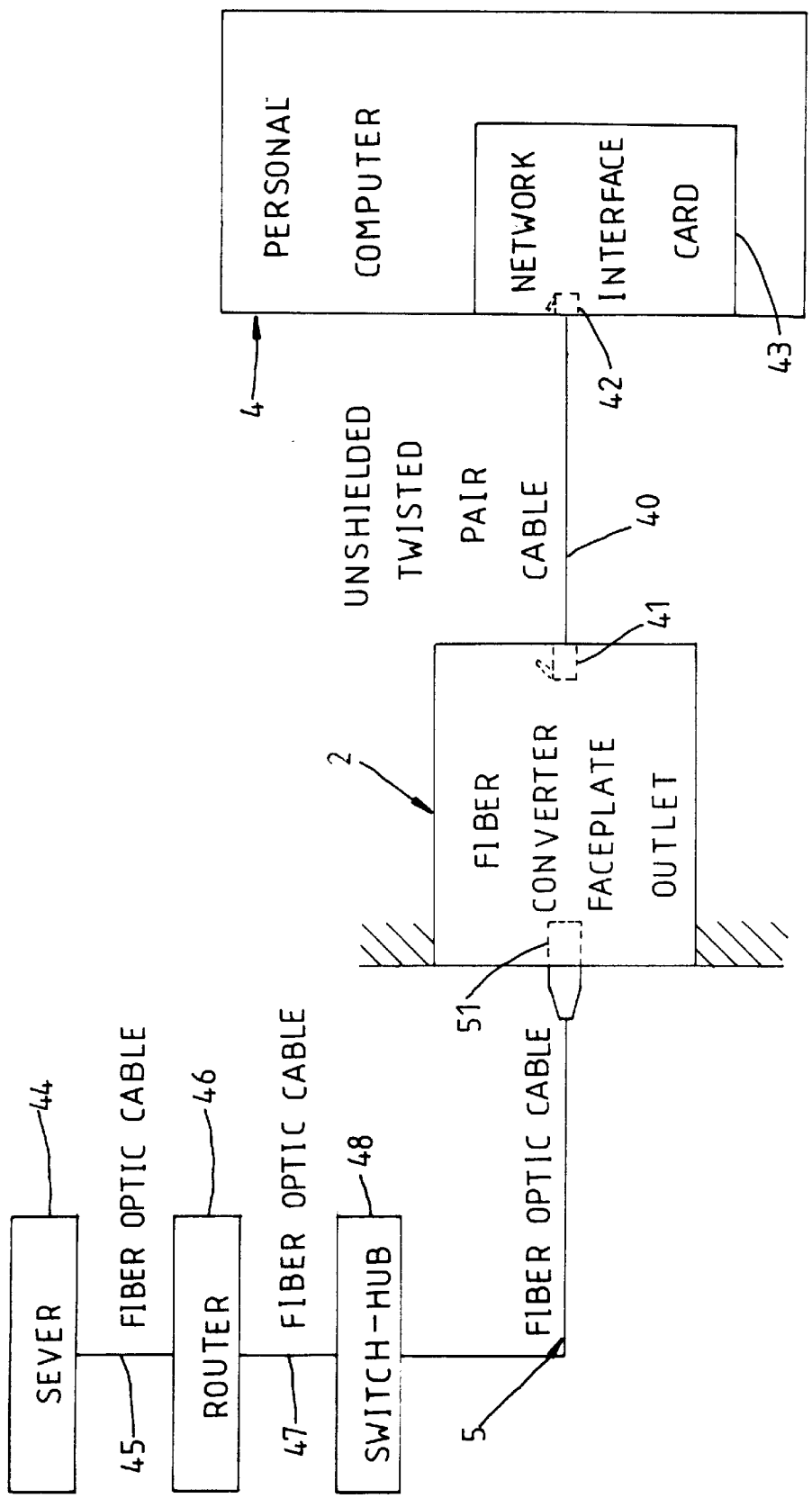
FIG. 3 is a block diagram showing an application example of the present invention.
Figure 4A:
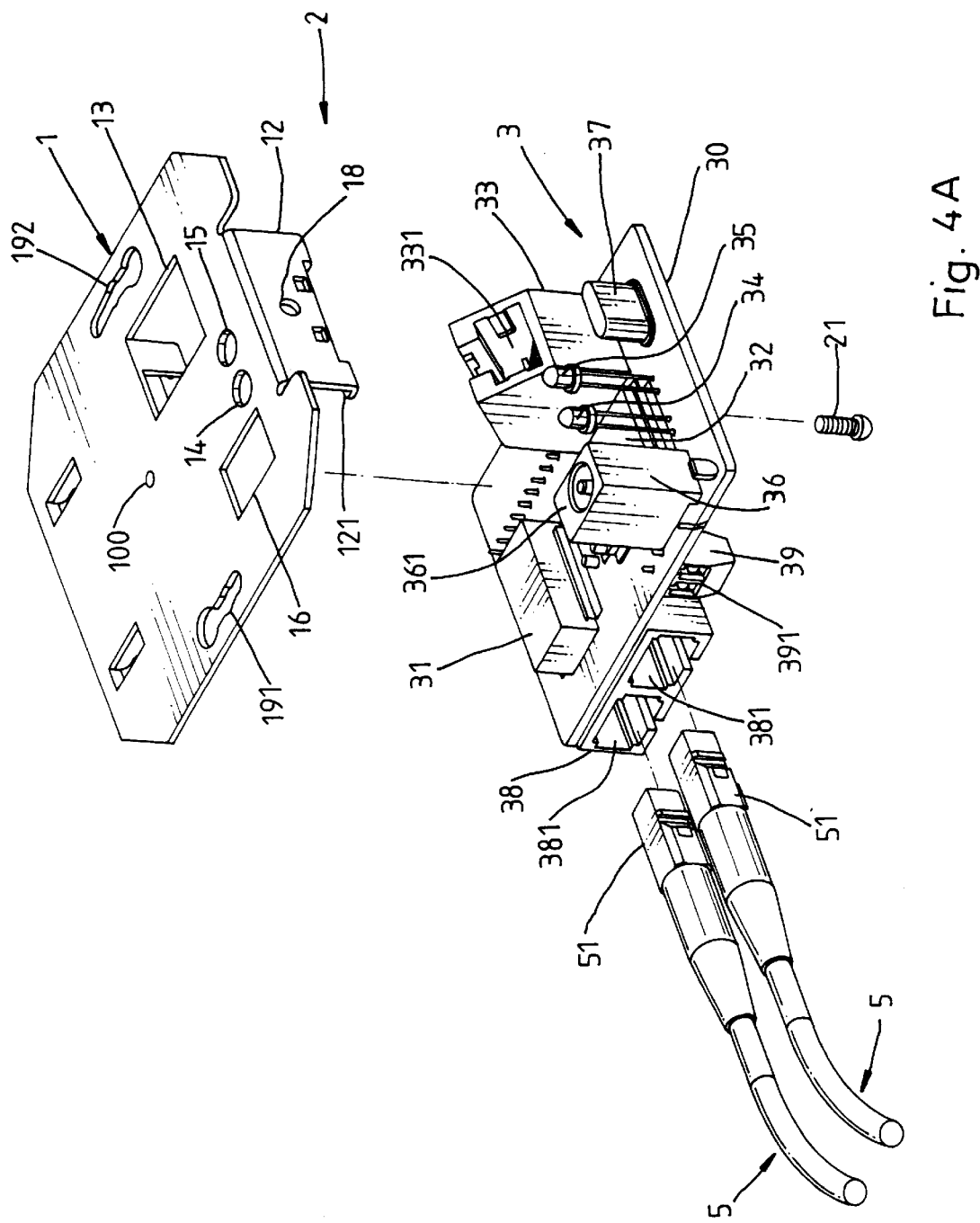
FIG. 4A is an exploded view of a rack and the circuit board unit for the fiber converter faceplate outlet according to the present invention (two fiber optic cables are shown).
Figure 4B:
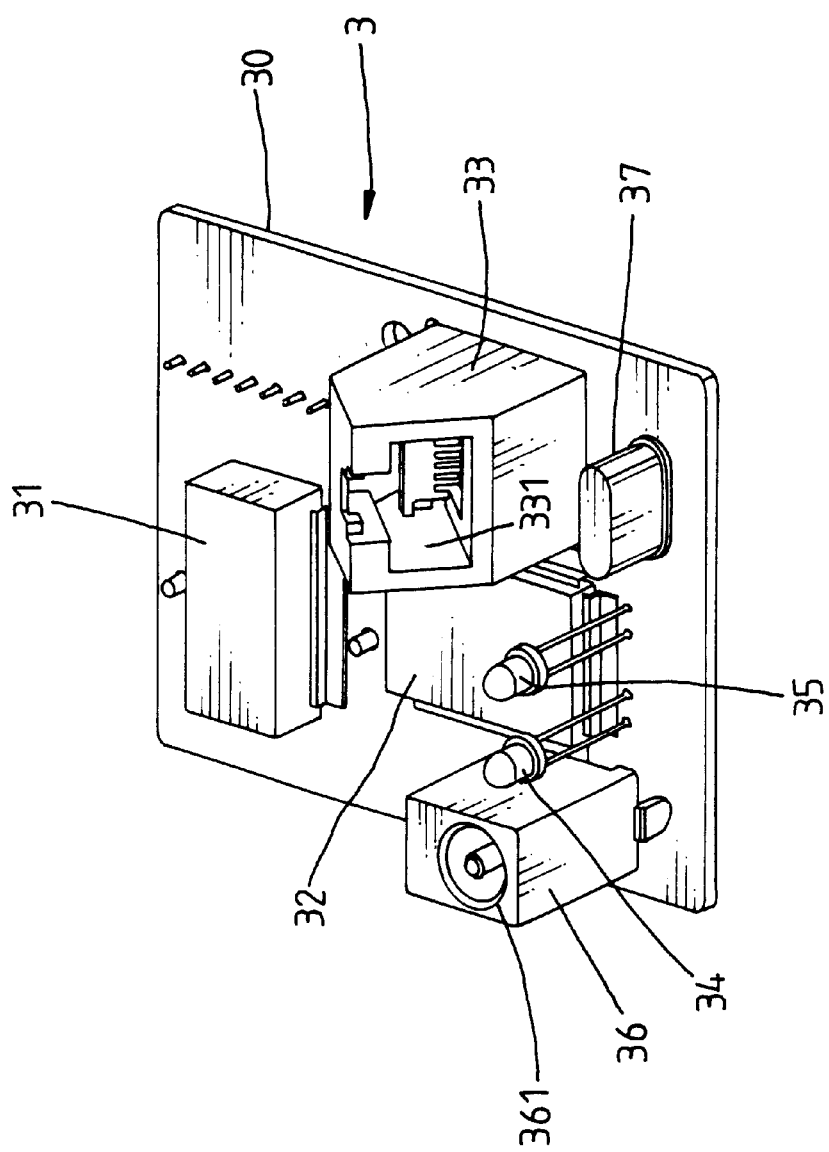
FIG. 4B is an oblique elevation of the circuit board unit for the fiber converter faceplate outlet according to the present invention.
Figure 5:
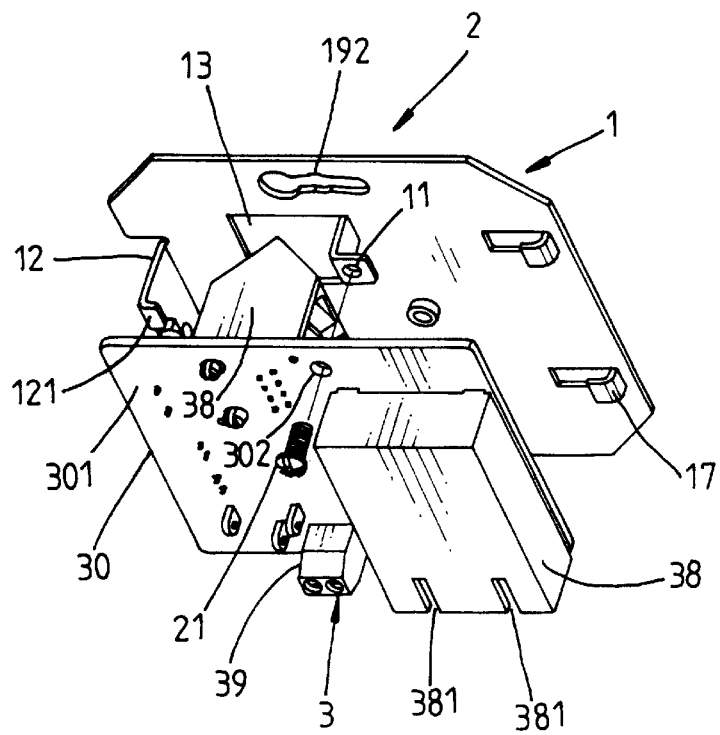
FIG. 5 is another exploded view of the rack and the circuit board unit for the fiber converter faceplate outlet according to the present invention when viewed from another angle.
Figure 6:
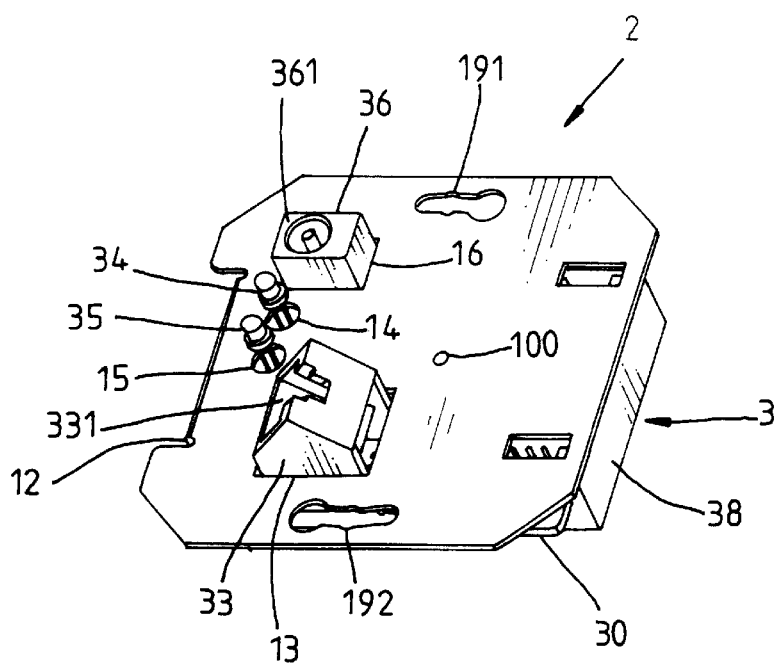
FIG. 6 is an assembly view of the rack and the circuit board unit according to the present invention.
Figure 7:
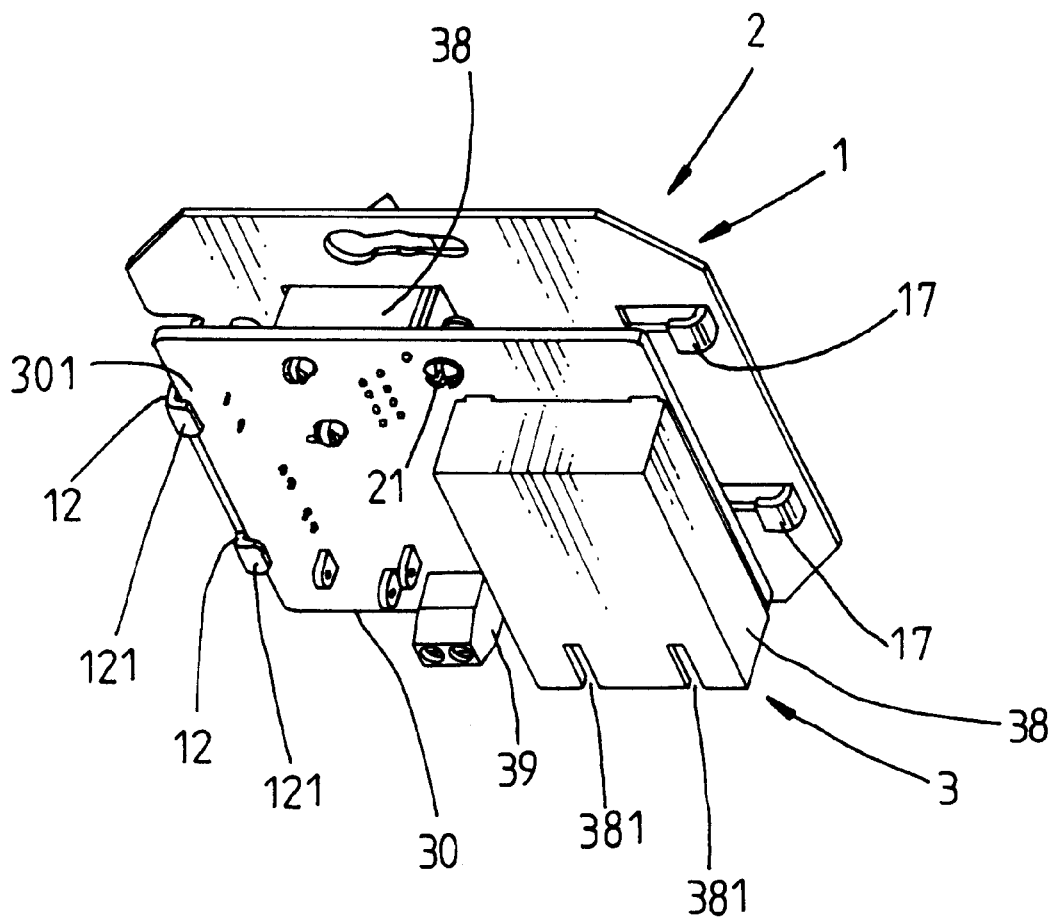
FIG. 7 is another assembly view of the rack and the circuit board unit when viewed from another angle according to the present invention.

Referring to FIGS. from 3 through 11, a fiber converter faceplate outlet 2 in accordance with the present invention is generally comprised of a rack 1, and a circuit board unit 3. The rack 1 comprises a plurality of screw holes 11 respectively fastened to respective mounting holes 302 of the circuit board 30 of the circuit board unit 3 by screws 21 (see FIG. 5), a hook plate 12 downwardly extended from one peripheral side thereof (see FIG. 5), the hook plate 12 having a hooked portion 121 hooked on the bottom edge 301 of the circuit board 30 of the circuit board unit 3 (see FIG. 7), and a plurality of through holes 13, 14, 15 and 16 adapted to receive component parts of the circuit board 30 of the circuit board unit 3. The circuit board 30 of the circuit board unit 3 comprises a telecommunication connector 33. having a RJ45 jack 331, a power signal light emitted diode 34, a link activity light emitted diode 35, a direct current power jack 36, a crystal 37, a line transformer 31, and a transceiver integrated circuit 32 respectively disposed at the top side thereof, a fiber optical transceiver 38 having two jacks 381 and a termination block 39 disposed at the bottom side thereof. The RJ45 jack 331 of the telecommunication connector 33, the power signal light emitted diode 34, the link activity light emitted diode 35 and the direct current power jack 36 are respectively positioned in the through holes 13, 14, 15 and 16 of the rack 1.

Referring to FIGS. 3, 4A, 6 and 7, the jacks 381 of the fiber optical transceiver 38 of the fiber converter faceplate outlet 2 are adapted to receive fiber connectors 51 of fiber optical cables 5, which are in turn connected to a switch-hub 48, which is connected to a router 46 through a fiber optic cable 47 and then to a sever 44 through another fiber optic cable 45. The RJ45 jack 331 of the telecommunication connector 33 is connected to a network interface card 43 in a personal computer 4 through a unshielded twisted pair cable 40. The unshielded twisted pair cable 40 has a first RJ45 plug 41 at one end connected to the RJ45 jack 331 of the telecommunication Connector 33, and a second RJ45 plug 42 at the other end connected to a RJ45 jack (not shown) of the network interface card 43. Thus, the personal computer 4 is linked to the sever 44.

Figure 8:
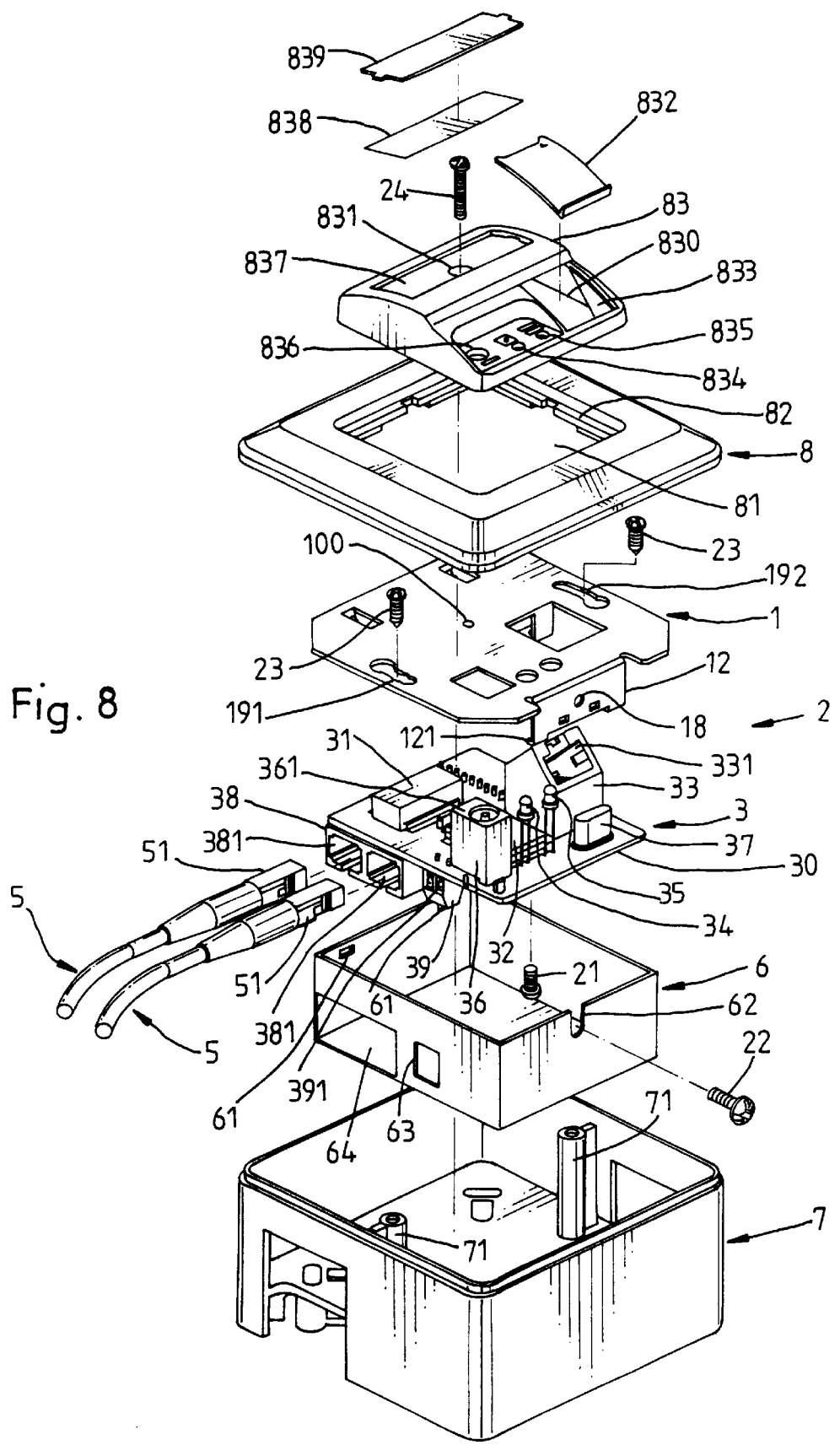
FIG. 8 is an exploded view of the fiber converter faceplate outlet, the metal shield, the wall box, the cover plate, the ornamental cap, and the fiber optic cables according to the present invention.
Figure 9:
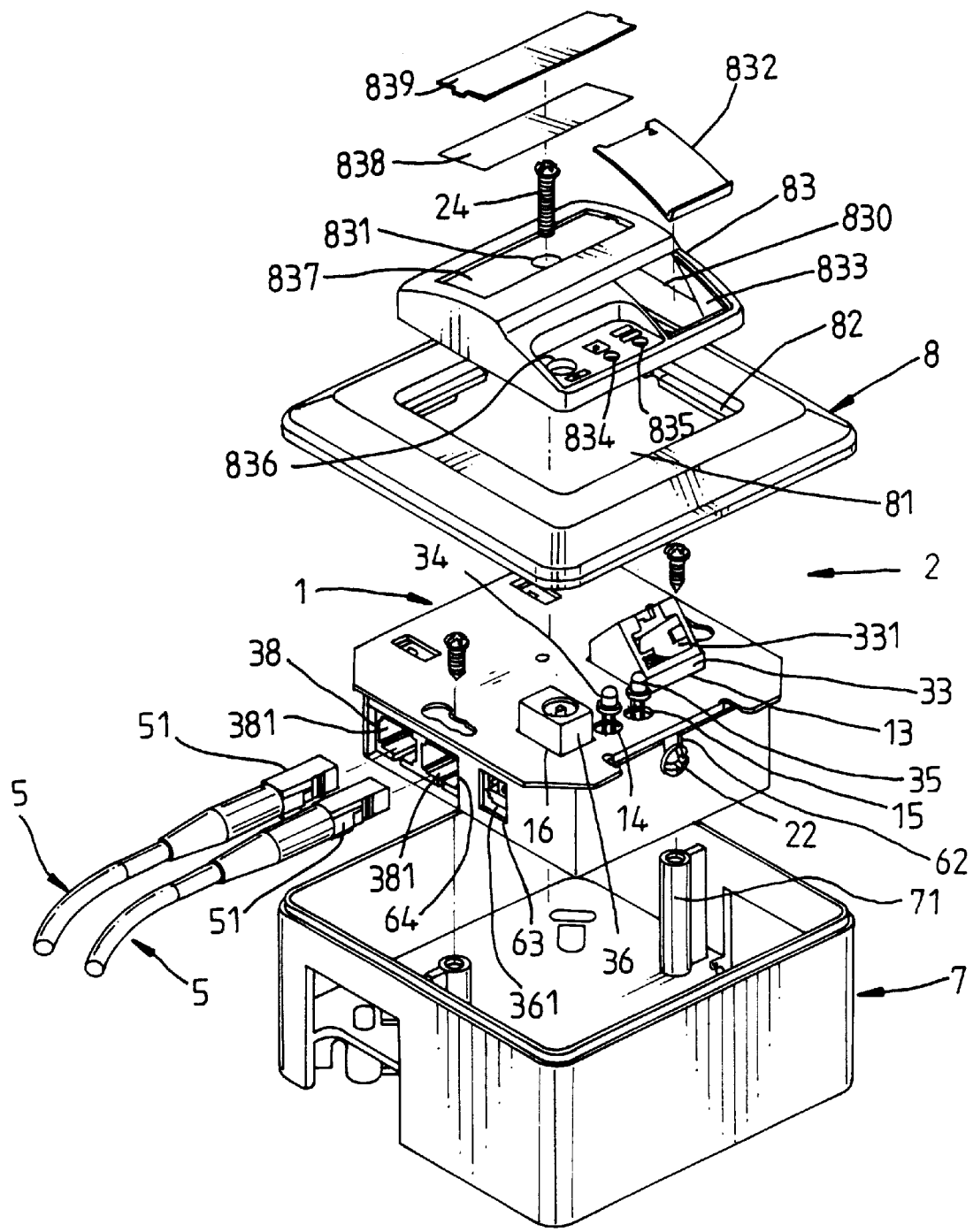
FIG. 9 is similar to FIG. 8 but showing the rack, the circuit board unit and the metal shield fastened together.

The rack 1 of the fiber converter faceplate outlet 2 further comprises two bottom hooks 17 (see FIGS. 5 and 7) respectively hooked in respective hook holes 61 of a metal shield 6 (see FIG. 8), a screw hole 18 extended through the hook plate 12 and fastened to a mounting hole 62 of the metal shield 6 by a screw 22 (see FIG. 9). The metal shield 6 protects the fiber converter faceplate outlet 2 against electromagnetic interference. The metal shield 6 further comprises two through holes 63 and 64 disposed at one side corresponding to the two jacks 381 of the fiber optical transceiver 38 and the receiving side 391 of the termination block 39.

Figure 10:
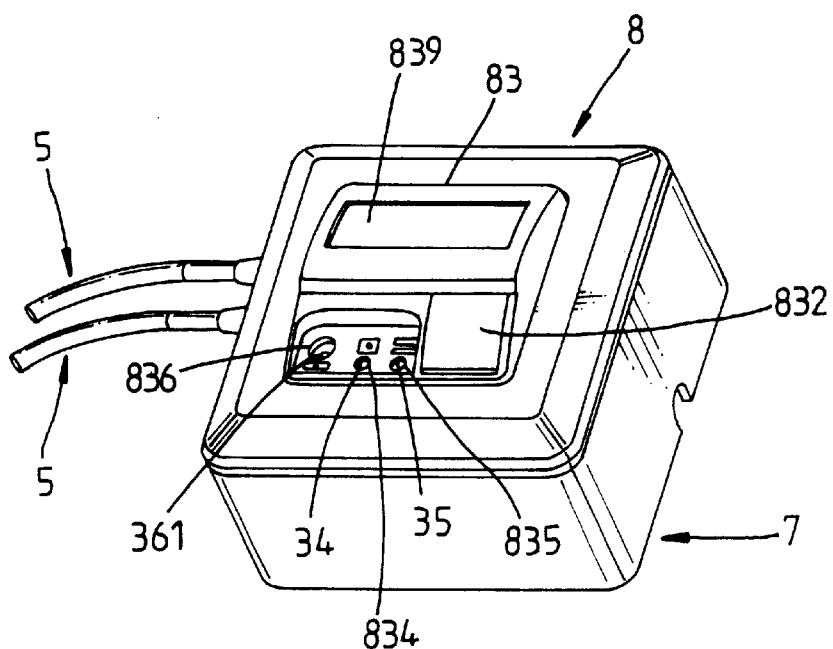
FIG. 10 is an assembly view of FIG. 9.
Figure 11:
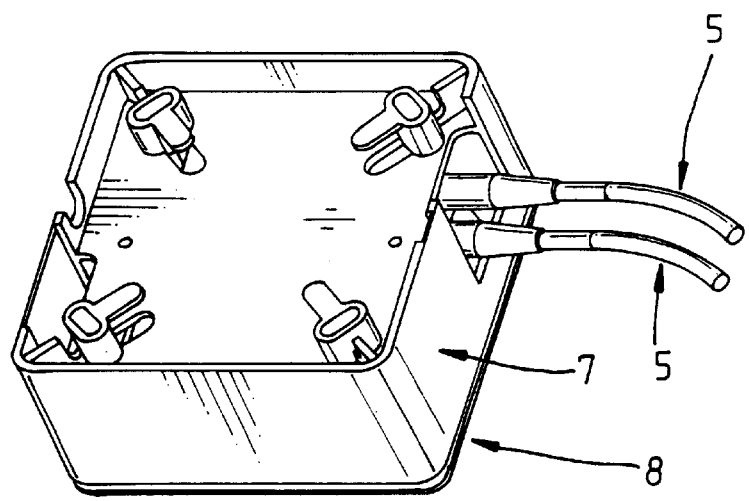
FIG. 11 shows the assembly of FIG. 10 viewed from another angle.

Referring to FIGS. 8, 10 and 11, the rack 1 further comprises a plurality of keyway-like mounting holes 191 and 192 respectively fastened by screws 23 to respective posts 71 of a junction box, for example, a wall box 7.

The receiving side 361 of the direct current power jack 36 is adapted to receive external power cable, and the receiving side 391 of the terminal block 39 is adapted to receive a house internal power cable (not shown).

Referring to FIG. 8, a cover plate 8 may be used and covered on the wall box 7. The cover plate 8 comprises a center opening 81 and a protruded flange 82 extended around the center opening 81 and adapted to hold an ornamental cap 83. The ornamental cap 83 comprises a mounting hole 831 fastened to a screw hole 100 of the rack 1 by a screw 24, a plurality of through holes 833, 834, 835. and 836 corresponding to the telecommunication connector 33, the power signal light emitted diode 34, the link activity light emitted diode 35 and the direct current power jack 36 of the circuit board unit 3, a spring member 830 provided on the inside, a movable cover plate 832 supported on the spring member 830 and adapted to close the through hole 833. When pushing the movable cover plate 832 inwards against the spring member 830, the through hole 833 is opened, and the first RJ45 plug 41 of the unshielded twisted pair cable 40 can then be inserted and connected to the RJ45 jack 331 of the telecommunication connector 33. The ornamental cap 83 further comprises a top recess 837 adapted to hold an index sheet 838 and a transparent plate 839.

Figure 12:
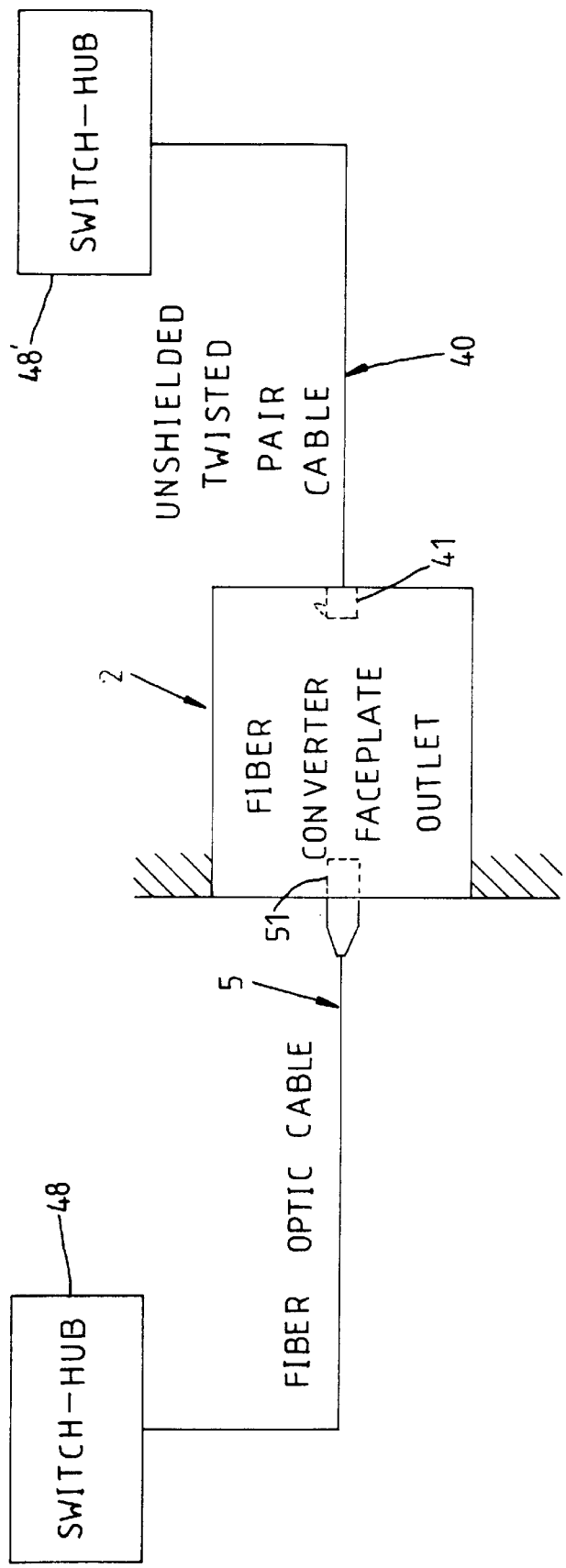
FIG. 12 is a block diagram showing another application example of the present invention.

FIG. 12 shows another application example of the present invention, in which the fiber converter faceplate outlet 2 is connected between two switch-hubs 48 and 48'.

A prototype of fiber converter faceplate outlet has been constructed with the features of FIGS. 3~11. The fiber converter faceplate outlet functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

I claim:

1. A fiber converter faceplate outlet comprising:

a rack, said rack comprising a plurality of screw holes, a hook plate downwardly extended from one peripheral side thereof, and a plurality of through holes; and a circuit board unit, said circuit board unit comprising a circuit board, said circuit board comprising a mounting holes respectively fastened to the screw holes of said rack, a top side, and a bottom side, said bottom side having a bottom edge secured to the hook plate of said rack, a telecommunication connector mounted on the top side of said circuit board, said telecommunication connector having a RJ45 jack positioned in one through hole of said rack and adapted to receive the RJ45 plug of a unshielded twisted pair cable, a power signal light emitted diode mounted on the top side of said circuit board and positioned in one through hole of said rack, a link activity light emitted diode mounted on the top side of said circuit board and positioned in one through hole of said rack, a direct current power jack mounted on the top side of said circuit board and positioned in one through hole of said rack, a crystal mounted on the top side of said circuit board, a line transformer mounted on the top side of said circuit board, a transceiver integrated circuit mounted on the top side of said circuit board, a fiber optical transceiver mounted on the bottom side of said circuit board, said fiber optical transceiver having two jacks adapted to receive the fiber connector of a respective optic cable, and a termination block mounted on the bottom side of said circuit board.

2. The fiber converter faceplate outlet of claim 1 wherein said rack further comprises two bottom hooks and a screw hole, and is covered with a metal shield to protect said circuit board unit against electromagnetic interference, said metal shield comprising two hook holes, which receive the bottom hooks of said rack respectively, a mounting hole fastened to the screw hole of said rack by a screw, and a plurality of through holes disposed at one side corresponding to the jacks of said fiber optical transceiver and a front side of said termination block.

3. The fiber converter faceplate outlet of claim 1 wherein said rack further comprises a plurality of keyway-like mounting holes for fastening to respective posts of a junction box by screws.

4. The fiber converter faceplate outlet of claim 1 wherein said direct current power jack has a receiving side adapted to receive external power cable from external power supply, and said terminal block having a receiving side adapted to receive a house internal power cable.

* * * * *